United States Patent [19]

Bouchard

[11] Patent Number: 5,069,404

[45] Date of Patent: * Dec. 3, 1991

[54] ELLIPTICAL RAM AIR PRESSURIZED AIRFOIL PARACHUTE

[76] Inventor: John G. Bouchard, P.O. Box 688, North Conway, N.H. 03860

[ * ] Notice: The portion of the term of this patent subsequent to May 29, 2007 has been disclaimed.

[21] Appl. No.: 416,137

[22] Filed: Oct. 2, 1989

Related U.S. Application Data

[62] Division of Ser. No. 64,178, Jun. 18, 1987, Pat. No. 4,928,909.

[51] Int. Cl.⁵ .............................................. B64D 17/02
[52] U.S. Cl. .................................................... 244/145
[58] Field of Search ................ 244/142, 145, 146, 902

[56] References Cited

U.S. PATENT DOCUMENTS

| | | | |
|---|---|---|---|
| 3,104,857 | 9/1963 | Knacke et al. | 244/145 |
| 3,131,894 | 5/1964 | Jalbert | 244/145 |
| 3,433,441 | 3/1969 | Cummings | 244/152 |
| 3,524,613 | 8/1970 | Reuter et al. | 244/142 |
| 3,724,789 | 4/1973 | Snyder | 244/145 |
| 3,822,844 | 7/1974 | Sutton | 244/145 |
| 3,944,169 | 3/1976 | Bede | 244/142 |
| 3,945,592 | 3/1976 | Sutton | 244/152 |
| 4,389,031 | 6/1983 | Whittington | 244/902 |
| 4,399,969 | 8/1983 | Gargano | 244/902 |
| 4,424,945 | 1/1984 | Dell | 244/902 |

FOREIGN PATENT DOCUMENTS 1506125  7/1969  Fed. Rep. of Germany ...... 244/145

OTHER PUBLICATIONS

Perkins et al., "*Airplane Performance Stability and Control*", Wiley Press, 1967, pp. 72–75.
Para Gear Catalog, 1984–85, pp. 17, 19.

*Primary Examiner*—Galen Barefoot
*Attorney, Agent, or Firm*—Davis, Bujold & Streck

[57] ABSTRACT

An improved parachute utilizing a ram air design and having an upper surface connected to a lower surface by a plurality of rib members and forming a plurality of chambers therebetween. The end chambers are smaller than the center chambers and this increases the lift-to-drag ratio of the parachute. The parachute has a substantially elliptical planform so as to increase the aspect and glide ratios of the parachute.

6 Claims, 3 Drawing Sheets

ELLIPTICAL RAM AIR PRESSURIZED AIRFOIL PARACHUTE

This is a divisional of copending application Ser. No. 07/064,178, filed on June 18, 1987, now U.S. Pat. No. 4,928,909.

The present invention relates to an improved parachute design and more particularly to an improved ram air parachute having an elliptical planform with an aspect ratio that is substantially improved over the prior art so as to provide an improved glide ratio.

THE PRIOR ART

Parachute designs for parachutes capable of carrying one from a fixed high point, such as from the side or top of a mountain, to the ground level are generally well known. Such parachutes typically have a rectangular planform with an aspect ratio of approximately 2.00:1 to 3.00:1. An example of typical prior art is provided by U.S. Pat. No. 4,015,801, issued to Womble et al on April 5, 1977. Womble's maneuverable ram air inflated flexible aerial wing utilizes nonporous fabric configured in a generally rectangular planform with outlet scoops 12 and vents 13 in the upper portion of the parachute. An optional port 23 allows for uniform pressurization of the connected cells. U.S. Pat. No. 3,285,546, issued to Jalbert on Nov. 15, 1966, is another prior art patent which discloses a multi-cell wing type aerial device which suspends payloads in the atmosphere in a controlled manner. The device again has a generally rectangular planform comprising equidistantally spaced ribs 10 connecting a flexible canopy top 5 to a skin 6, and an air inlet 11 on the front edge with an air outlet 12 on the trailing edge.

Other typical prior art patents which disclose parachute type devices having these same general characteristics include U.S. Pat. No. 3,749,337 to Jalbert; U.S. Pat. No. 3,724,789 to Snyder; U.S. Pat. No. 3,524,613 to Reuter et al; U.S. Pat. No. 3,412,963 to Struble; U.S. Pat. No. 3,393,885 to Neumark; U.S. Pat. No. 3,428,277 to Everett; U.S. Pat. No. 3,131,894 to Jalbert; U.S. Pat. No. Re. 31,205 to Jalbert; U.S. Pat. No. 1,780,190 to Hoffman; U.S. Pat. No. 4,406,433 to Radkey et al; U.S. Pat. No. 3,972,495 to Jalbert; and U.S. Pat. No. 4,129,272 to Jones et al.

One problem with parachute designs of these types is that the aspect ratio is relatively low, which is a major cause of a decreased glide ratio, i.e. the horizontal distance traveled per unit of vertical distance traveled while descending.

Another problem with the prior art parachutes is that their generally rectangular planform often contributes to a decreased lift-to-drag ratio, which again results in a decreased glide ratio.

A further problem with the prior art is that larger and heavier parachutes are required to obtain a desired glide ratio.

OBJECTS OF THE INVENTION

Accordingly, a primary object of the present invention is to provide a parachute design which substantially reduces the problems noted above.

A more specific object is to provide a parachute which has a substantially elliptical planform in order to increase the aspect ratio. This in turn results in a higher glide ratio and improved control of the parachute's forward motion for the parachutist.

Another object is to provide a parachute design which provides for smaller chambers near the tips of the airfoil span, thus providing an increased lift-to-drag ratio which in turn increases the glide ratio. The smaller chambers also facilitate the inflation of the parachute while the parachutist is in a standing position.

SUMMARY OF THE PRESENT INVENTION

The foregoing objects and other objects, which will become apparent as the nature of the invention is better understood, are achieved by providing a parachute which comprises an upper surface attached to a lower surface with ribs, two stabilizers on each side, a relatively large air inlet in the front edge, and a closed trailing edge. Control cords are attached to various ribs and lead to the harness which is fastened to the parachutist. In the preferred embodiment hereinafter described, the upper surface and stabilizers are made from a nonporous material while the lower surface and ribs are made from a porous material.

GENERAL DESCRIPTION OF THE DRAWINGS

For a fuller understanding of the nature and objects of the present invention, reference should be had to the following description taken in connection with the accompanying drawings wherein.

DETAILED DESCRIPTION OF THE DRAWINGS

Figure 1:
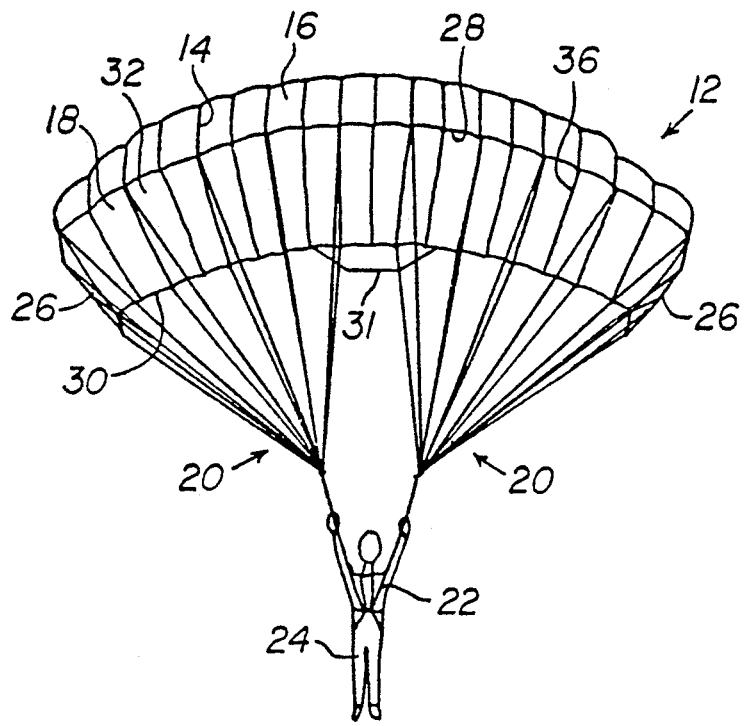
FIG. 1 is a front view of a ram air parachute of the present invention, with the control cords shown connected to the harness of a parachutist.

Turning first to FIG. 1, the preferred embodiment of the parachute 12 of the present invention comprises ribs 14, an upper surface 16, a lower surface 18, control cords 20, a harness 22 which attaches cords 20 to a parachutist 24, a stabilizer 26 on each side, a leading edge 28, and a trailing edge 30. Upper surface 16 and stabilizers 26 are preferably made of a nonporous material, such as coated nylon. Lower surface 18 and ribs 14 are preferably made of a porous material, such as a porous nylon material. Chambers 32 are defined by upper surface 16, lower surface 18, edges 28 and 30, and ribs 14. The front side of each chamber 32 is open to leading edge 28, and the back side of each chamber 32 is closed by trailing edge 30. This embodiment also includes a tail section 31 which could be either a piece of nonporous cloth sewn to the center portion of the trailing edge and extending rearward therefrom, or be a rearward extension of the center chambers having an upper nonporous surface and lower porous surface which could be inflated with ram air.

Figure 2:
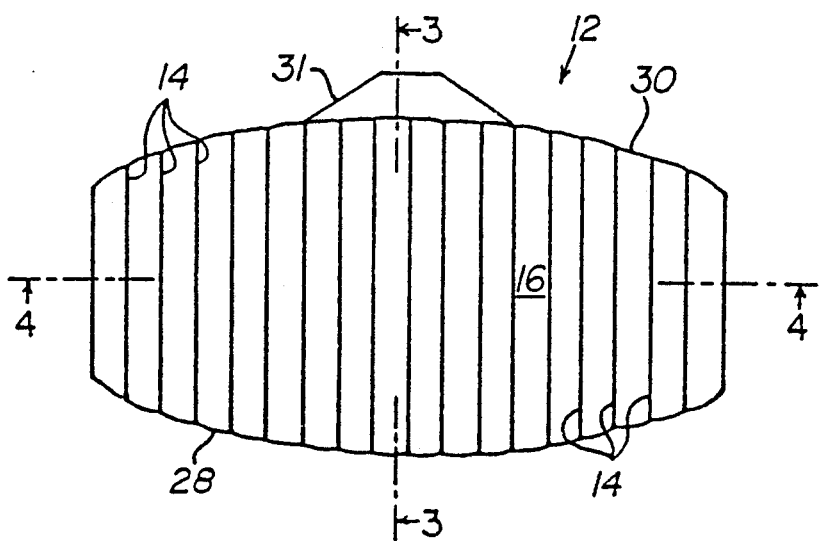
FIG. 2 is a top view of the parachute shown in FIG. 1.

Turning now to FIG. 2, the parachute planform is shown from the top in greater detail. The generally elliptical shape of parachute 12 is clearly depicted so as to further support later discussion of the improved aspect ratio and resultant glide ratio for this parachute configuration.

Figure 3:
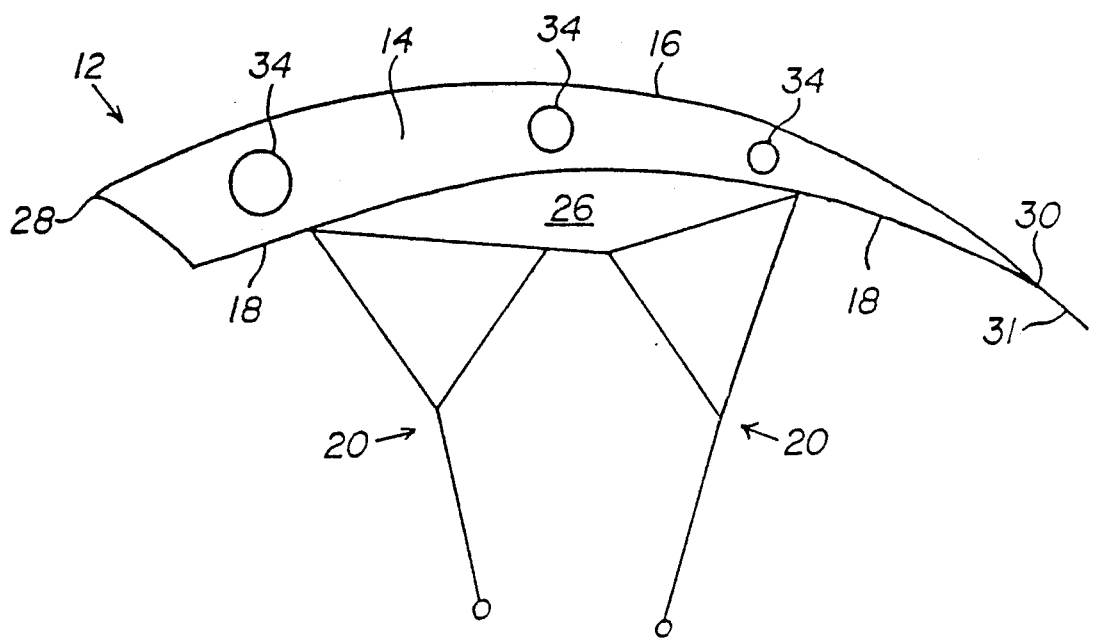
FIG. 3 is a side sectional view of the parachute taken along line 3—3 in FIG. 2.
Figure 4:
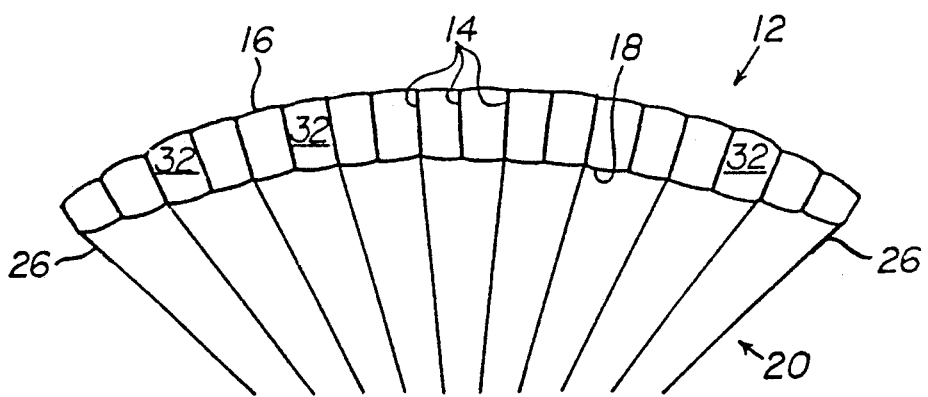
FIG. 4 is a spanwise sectional view of the parachute taken along line 4—4 in FIG. 2.

Turning to FIGS. 3 and 4, the sectional views illustrate the inner construction of parachute 12 in more detail, showing equalization ports 34 (FIG. 3) which connect adjacent chambers 32 so as to allow for uniform pressurization of all chambers 32 of the parachute. FIG. 3 also depicts the general configuration and relative dependency of stabilizer surface 26 below lower surface 18. Also, the relative size of leading edge 28, which is open to admit ram air, is shown with respect to trailing edge 30 which is closed.

In addition, the configuration of the attachment of control cords 20 to stabilizer surfaces 26, lower surface 18, and ribs 14 is shown. A cord 20 is attached to alternating ribs 14, as shown in FIG. 4. This configuration is generally known in the art and allows for relatively accurate control of the attitude and direction of parachute 12.

The primary advantage of this configuration for parachute 12 is the increased aspect ratio provided by the elliptical planform of the airfoil formed by the various surfaces described above. Prior art parachutes have generally rectangular planforms which allow for maximum aspect ratios of approximately 3.00:1. The aspect ratio (AR) is generally defined as the ratio of the square of the span ($S^2$) to the surface area (A) of the airfoil, where the span is the distance between stabilizer surfaces. Thus, $$AR = S^2/A$$

For the special case of a rectangular airfoil, this ratio reduces to AR=S/(chord width), where the chord width is the dimension from the leading edge to the trailing edge.

From the formula, it can be seen that the generally elliptical configuration of parachute 12 maximizes the span dimension, while the average distance between edges 28 and 30 can be minimized to reduce surface area A. For two parachutes of the same approximate surface area and chord, the parachute with an elliptical configuration will have a higher aspect ratio (because of a longer span) than the parachute with a rectangular configuration. Parachutes made according to the present invention have aspect ratios as high as 3.23:1. This increased aspect ratio allows for better glide ratios which approaches as high as 4.0:1. This gives a parachutist, such as one near the top of a mountain after a climb, more flexibility in planning a flight path back down the mountain, since some horizontal protrusions from the mountain, which provide insurmountable obstacles to prior art parachutes, may be cleared with a parachute having the higher glide ratio.

Another advantage of the present invention is a reduction in the size of a parachute required in order to get a desired higher glide ratio. Prior art parachutes with rectangular planforms have surface areas (A) of approximately 220-350 square feet in order to provide glide ratios in the approximate range of 2.5:1 to 3.0:1. While these prior art parachutes must be relatively large, i.e. 300-350 square feet surface area, to get the higher glide ratio, parachutes of the present invention can provide glide ratios of as much as 4.0:1 with a surface area of as little as approximately 220 square feet. For a given desired glide ratio, this allows a smaller parachute to be utilized, thus providing a substantial savings in weight of the parachute. This decreased weight can be an important factor for certain parachutists, e.g. a mountain climber who plans to return to the base of a mountain with a parachute.

Still another advantage of the present invention is the decreased volume of the chambers 32 near the stabilizers 26 which are located at the tips of the span of parachute 12. The smaller chamber volumes provide two improvements over the prior art. First, the parachute 12 is easier to load or inflate with air by a parachutist 24 who is preparing to jump from a high point. The parachutist merely flips the parachute 12 from the ground behind to an overhead position by quickly snapping the control cords 20 forward. This forward motion of the parachute causes air to flow into chambers 32 via leading edge 28 so as to inflate the parachute. Prior art rectangular parachutes have end chambers with much larger volumes near the span tips, thus requiring more forward thrust of the parachute in order to provide adequate airflow to inflate the chambers. The second improvement provided by the smaller chambers is an increase in the lift-to-drag ratio of the parachute 12. This is a direct result of the decreased drag produced by the smaller chambers. The improved lift-to-drag ratio contributes to the superior glide ratio of parachutes of the present invention.

Another factor contributing to this improved glide ratio is the relative porosity of the upper and lower surfaces 16 and 18. The experience of this inventor has shown that improved glide ratios are obtained using nonporous material for the upper surface 16 and porous material for the lower surface 18 and remaining surfaces.

A number of variations of the invention described above are possible. Although the preferred embodiment utilizes an upper surface 16 and stabilizers 26 made of a nonporous material such as nylon, those surfaces of the parachute 12 could also be constructed of porous material. The preferred embodiment could also be modified so that lower surface 18 and ribs 14 are made of a nonporous material.

Figure 5:
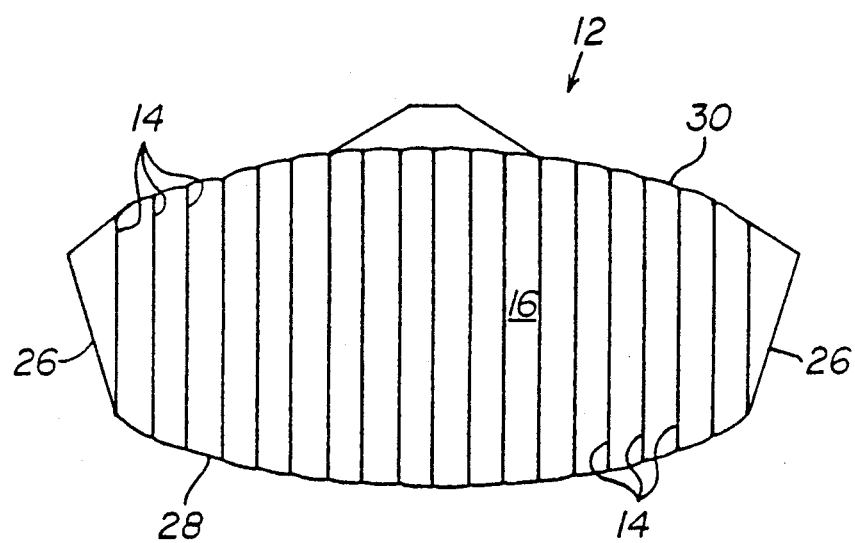
FIG. 5 is a top plan view of a second embodiment of a parachute according to the present invention shown in a deflated condition.

Turning to FIG. 5, an alternative embodiment of the parachute of the present invention is shown in an uninflated state. Comparison with the inflated view of the preferred embodiment in FIG. 2 reveals a configuration which is a true elliptically shaped parachute. Although the parachute of FIG. 5 may have slightly less aerodynamic and control capabilities relative to the preferred embodiment, it still attains the superior aspect and glide ratios discussed above with even less material and weight than the preferred embodiment utilizes.

The ram air parachute is also suitable for parachuting applications such as jumping out of airplanes and gliding to a "target" area.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A ram air parachute comprising in combination:
   an upper surface, having a generally elliptical plan configuration which maximizes an aspect ratio of the parachute;
   a lower surface having a generally elliptical plan configuration similar to said upper surface;
   a plurality of ribs connecting said upper and lower surfaces together, said ribs having a plurality of openings therein;

a leading edge defining a relatively large opening for admitting ram air into said ram air parachute;

a trailing edge configured so as to minimize the flow of air through said ram air parachute;

a plurality of chambers defined by said upper and lower surfaces, said ribs, said leading edge, and said trailing edge, said plurality of chambers communicating through said plurality of openings in said ribs so as to maintain equal air pressure in all of said chambers;

two stabilizer surfaces depending downward on opposite sides of said ram air parachute, said stabilizer surfaces being attached to said upper and lower surfaces; and means for controllably attaching said ram air parachute to a parachutists;

wherein the aspect ratio of said ram air parachute is in excess of three thereby resulting in a glide ratio in excess of three.

2. A parachute according to claim 1 wherein said means for controllably attaching said parachute to said parachutist comprises multiple control cords attached to said connecting ribs so as to allow said parachutist to use said stabilizer surfaces, said leading edge, and said trailing edge to control the attitude and direction of said parachute.

3. A parachute according to claim 1 wherein said upper surface and said stabilizer surfaces are constructed of nonporous material and said ribs and said lower surface are constructed from porous material.

4. A parachute according to claim 1 wherein said upper surface, lower surface, ribs and stabilizer surfaces are constructed of porous material.

5. A parachute according to claim 1 wherein said upper surface, ribs, lower surface and stabilizer surfaces are constructed of nonporous material.

6. A parachute according to claim 1 wherein said upper surface further includes tail means extending rearward from the trailing edge to provide additional parachute stability.

* * * * *